(12) United States Patent
Daniels et al.

(10) Patent No.: US 10,006,300 B2
(45) Date of Patent: Jun. 26, 2018

(54) ARMORING SEALING FINS OF TIAL VANES BY INDUCTION BRAZING HARD-MATERIAL PARTICLES

(71) Applicant: MTU Aero Engines AG, Munich (DE)

(72) Inventors: Bernd Daniels, Groebenzell (DE); Karl-Hermann Richter, Markt Indersdorf (DE)

(73) Assignee: MTU Aero Engines AG, Munich (DE)

( * ) Notice: Subject to any disclaimer, the term of this patent is extended or adjusted under 35 U.S.C. 154(b) by 840 days.

(21) Appl. No.: 14/358,939

(22) PCT Filed: Nov. 6, 2012

(86) PCT No.: PCT/DE2012/001068
§ 371 (c)(1),
(2) Date: May 16, 2014

(87) PCT Pub. No.: WO2013/071909
PCT Pub. Date: May 23, 2013

(65) Prior Publication Data
US 2014/0308117 A1  Oct. 16, 2014

(30) Foreign Application Priority Data
Nov. 17, 2011  (DE) .................. 10 2011 086 524

(51) Int. Cl.
*F01D 9/04* (2006.01)
*F01D 5/22* (2006.01)
(Continued)

(52) U.S. Cl.
CPC .............. *F01D 9/041* (2013.01); *B23K 1/002* (2013.01); *B23K 1/0018* (2013.01);
(Continued)

(58) Field of Classification Search
CPC .......... F01D 9/041; F01D 5/288; F01D 5/225; B23K 1/0018; B23K 1/002; C23C 24/103
(Continued)

(56) References Cited

U.S. PATENT DOCUMENTS 4,294,615 A * 10/1981 Blackburn ............... C22C 14/00
420/420
4,832,993 A * 5/1989 Coulon ................ B23K 35/005
416/224

(Continued)

FOREIGN PATENT DOCUMENTS

DE          196 42 980 C1     8/1998
DE      10 2007 010 256 A1    9/2008
(Continued)

OTHER PUBLICATIONS

International Search Report dated Jan. 10, 2013 (Two (2) pages).
(Continued)

*Primary Examiner* — Jason T Newton
(74) *Attorney, Agent, or Firm* — Crowell & Moring LLP

(57) ABSTRACT

A method for armoring TiAl vanes of turbomachines is disclosed. A TiAl vane is provided onto which a mixture of at least one hard material and at least one braze material is applied so that subsequently the mixture can be brazed on the TiAl vane by an inductive heating process. A TiAl vane for a turbomachine, in particular for an aircraft engine, is also disclosed. The TiAl vane includes a TiAl main part and an armor which consists of a mixture of hard materials and braze material.

16 Claims, 2 Drawing Sheets

(51) Int. Cl.
  *F01D 5/28* (2006.01)
  *C23C 24/10* (2006.01)
  *B23K 1/00* (2006.01)
  *B23K 1/002* (2006.01)

(52) U.S. Cl.
  CPC ............ *C23C 24/103* (2013.01); *F01D 5/225* (2013.01); *F01D 5/288* (2013.01)

(58) Field of Classification Search
  USPC .............. 418/173.1; 29/889.1, 402.08, 889.7
  See application file for complete search history.

(56) References Cited

U.S. PATENT DOCUMENTS

| | | | | |
|---|---|---|---|---|
| 4,851,188 A * | 7/1989 | Schaefer | ................ | B22F 7/062 29/889.71 |
| 5,281,484 A * | 1/1994 | Tank | .................... | B23K 35/304 148/240 |
| 5,318,214 A * | 6/1994 | Lucas, Jr. | ................ | B23K 1/19 228/121 |
| 5,340,530 A * | 8/1994 | Coulon | .................... | B22F 5/04 419/49 |
| 5,448,828 A * | 9/1995 | Willems | .................... | B22F 7/06 29/889.1 |
| 5,831,252 A * | 11/1998 | Shimizu | ............... | B23K 13/015 219/117.1 |
| 5,890,274 A * | 4/1999 | Clement | ............ | B23K 35/0222 228/248.1 |
| 5,902,421 A * | 5/1999 | Christy | ................ | B23K 35/304 148/428 |
| 5,913,555 A | 6/1999 | Richter et al. | | |
| 6,047,876 A * | 4/2000 | Smith | ...................... | B23K 1/06 228/111.5 |
| 6,223,976 B1 | 5/2001 | Clement | ................... | B23K 1/00 228/181 |
| 6,387,541 B1 * | 5/2002 | Gray | .................... | B32B 15/016 138/140 |
| 6,521,059 B1 * | 2/2003 | Nazmy | .................... | C22F 1/10 148/421 |
| 7,160,635 B2 | 1/2007 | Leyens | ................. | C23C 14/022 416/241 B |
| 7,326,892 B1 * | 2/2008 | Cretegny | ............... | B23K 1/005 219/615 |
| 7,984,547 B2 * | 7/2011 | Steinhardt | ............... | B23P 6/007 29/889.1 |
| 8,882,442 B2 * | 11/2014 | Smarsly | ............. | B23K 20/1205 29/525.14 |
| 2005/0064220 A1 * | 3/2005 | Hasz | ........................ | C23C 24/10 428/546 |
| 2007/0281175 A1 * | 12/2007 | Hoffmann | ............ | B23K 1/0008 428/457 |
| 2008/0003453 A1 * | 1/2008 | Ogren | ..................... | C22C 38/40 428/660 |
| 2008/0145528 A1 * | 6/2008 | Deng | ........................ | B05D 1/60 427/180 |
| 2009/0283503 A1 * | 11/2009 | Schreiber | ............. | B23K 1/0018 219/121.64 |
| 2010/0151145 A1 * | 6/2010 | Richter | ................. | B22F 3/1055 427/543 |
| 2010/0322780 A1 | 12/2010 | Manier | | |
| 2012/0125979 A1 * | 5/2012 | Daniels | ................... | F01D 5/005 228/119 |
| 2012/0125980 A1 * | 5/2012 | Richter | ................... | F01D 5/225 228/159 |
| 2013/0143068 A1 * | 6/2013 | Richter | .................... | B23K 9/04 428/636 |
| 2014/0342169 A1 * | 11/2014 | Daniels | ..................... | F01D 5/22 428/457 |
| 2015/0044505 A1 * | 2/2015 | Nishikawa | ........... | B32B 15/016 428/660 |
| 2015/0056467 A1 * | 2/2015 | Bilhe | ...................... | C23C 10/48 428/652 |
| 2015/0104318 A1 * | 4/2015 | Koch | ................... | B23K 1/0018 416/213 R |

FOREIGN PATENT DOCUMENTS

| | | |
|---|---|---|
| DE | 10 2007 056 454 A1 | 5/2009 |
| DE | 10 2008 003 100 A1 | 7/2009 |
| DE | 10 2009 007 666 A1 | 8/2010 |
| DE | 10 2009 008 887 A1 | 8/2010 |
| EP | 0 518 049 A2 | 12/1992 |
| EP | 1 857 217 A1 | 11/2007 |
| EP | 2 087 961 A1 | 8/2009 |
| FR | 2 906 172 A1 | 3/2008 |
| GB | 2 294 951 A | 5/1996 |
| WO | WO 2008/106935 A1 | 9/2008 |
| WO | WO 2008/135803 A1 | 11/2008 |

OTHER PUBLICATIONS

German Examination Report dated Jun. 11, 2012 (Six (6) pages).
Konetschny, C. Neue Materialien für Turbinewerkstoffe der Zukunft. materialsgate.de, Sep. 2008. URL: http://www.materialsgate.de/de/mnews/3556/Neue+Materialien+f%C3%BCr+Turbinewerkstoffe+der+Zukunft.html [abgerufen am Aug. 6, 2012], with mechanical translation.
Titanaluminide. In: Wikipedia, Die freie Enzyklopädie. URL: http://de.wikipedia.org/wiki/Titanaluminide, Archiviert in http://www.archive.org am Sep. 13, 2009 [ abgerufen am Aug. 6, 2012] with mechanical translation.

* cited by examiner

ARMORING SEALING FINS OF TIAL VANES BY INDUCTION BRAZING HARD-MATERIAL PARTICLES

This application claims the priority of International Application No. PCT/DE2012/001068, filed Nov. 6, 2012, and German Patent Document No. 10 2011 086 524.1, filed Nov. 17, 2011, the disclosures of which are expressly incorporated by reference herein.

BACKGROUND AND SUMMARY OF THE INVENTION

The present invention relates to a method for armoring TiAl vanes of turbomachines and a corresponding TiAl vane.

In the case of turbomachines, such as stationary gas turbines or aircraft engines for example, in some cases components are included that move at high speeds relative to other components and they touch at least during a run-in time resulting in sliding contact. For this reason, these types of components must be provided with armoring in order to protect against wear. This also applies for example to sealing ribs, so-called sealing fins, which are provided on rotating vanes of corresponding turbomachines.

However, the problem when applying a corresponding armoring is that it possibly requires process temperatures to apply the armoring which the base material of the component being armored cannot readily tolerate. This also applies for example to vanes of turbomachines which are fabricated of TiAl materials. These types of materials, which are made predominantly of titanium and aluminum to form intermetallic phase, such as gamma TiAl, can only be provided with corresponding armoring in a limited way because of limited temperature resistance.

Applying armoring with plasma spraying is known from the prior art, wherein the temperature stress of a TiAl material can be kept sufficiently low by means of a locally limited application. However, this requires correspondingly time-consuming masking devices in order to apply a spray coating only to a desired locally limited area. In addition, these types of plasma-sprayed hard-material layers have problems related to adhesive properties so that intermediate layers containing nickel must be provided, which further increases the cost and can also lead to the formation of brittle nickel-titanium phases.

Applying the armoring to sealing fins is difficult in particular because of the geometric conditions and dimensions.

A method for coating components is generally known from German Patent Document No. DE 10 2007 056 454 A1 in which a mixture of a braze material and a coating material is applied by means of kinetic cold gas spraying and then inductively heated. However, the time-consuming masking of areas that are not supposed to be coated is also required in conjunction with kinetic cold gas spraying even though it is possible to keep the temperature stress low due to the kinetic cold gas spraying.

Therefore, the object of the present invention is providing a method for armoring TiAl vanes and in particular sealing fins of TiAl vanes and correspondingly armored TiAl vanes, in which the problems of the prior art are eliminated or reduced, and, in particular, efficient production with low temperature stress is made possible for the base material so that the component properties of the TiAl vanes are not altered as much as possible.

The invention starts with the knowledge that precisely for TiAl vanes, a brazing application of hard materials by induction brazing is possible without the temperature stress being too high for the TiAl material, because only a very limited local area must be heated in induction brazing.

In particular, such a method can also be used for the sealing fins of TiAl vanes that are difficult to coat.

The present invention understands TiAl vanes or TiAl materials to be materials that are formed predominantly of titanium and aluminum or whose largest constituents are titanium and aluminum. This includes, in particular materials whose structure have a large proportion of intermetallic phases such as $\gamma$-TiAl or $\alpha_2$-Ti$_3$Al. The corresponding materials can also be alloyed with other elements, such as niobium, manganese or the like for example.

The braze materials which can be used for the brazing application of hard materials include Ti-based braze materials, Ti60CuNi, Ti70CuNi, Ni-based braze materials, AMS47XX, ASM4775, ASM4776, ASM4777, ASM4778, ASM4779 and ASM4782.

Ti-based braze material is understood in this case to mean a braze material which has a predominant proportion of titanium or for which titanium constitutes the largest constituent, such as Ti60CuNi or Ti70CuNi for example. In the case of Ti60CuNi or Ti70CuNi, the proportion of titanium is 60 or 70% by weight.

In addition, Ni-based braze materials can be used in which nickel in turn constitutes the predominant proportion or the largest constituent. Known nickel braze materials are marketed with the designation AMS47XX, wherein XX is a placeholder for numbers between 1 and 9. Special examples that are well suited for the present invention are ASM4775 with 14% by weight chromium, 4.5% by weight iron, 4.5% by weight silicon, 3.1% by weight boron and 0.7% by weight carbon and the remainder nickel; ASM4776 with 14% by weight chromium, 4.5% by weight iron, 4.5% by weight silicon, 3.1% by weight boron and the remainder nickel; ASM4777 with 7% by weight chromium, 3% by weight iron, 4.1% by weight silicon, 3% by weight boron and the remainder nickel; ASM4778 with 4.5% by weight silicon, 2.9% by weight boron and the remainder nickel; ASM4779 with 3.5% by weight silicon, 1.9% by weight boron and the remainder nickel; and ASM4782 with 19% by weight chromium, 10% by weight silicon and the remainder nickel.

The hard materials, which are applied to the TiAl vane in a mixture of at least one hard material and at least one braze material, can comprise aluminum oxide, boron nitride, cubic boron nitride, silicon carbide and titanium carbide.

The mixture of hard material and braze material can be selected in a ratio of 1:1 to 9:1 hard material to braze material.

To apply the mixture of hard material and braze material, a brazing preform can be sintered of corresponding particles of hard material and braze material, which can then be arranged on the TiAl vane for example by means of an adhesive or by a welded joint, such as a spot weld for example, in particular a resistance spot weld, in order to be brazed subsequently by means of an inductive heating process. In addition to pre-sintered brazing preforms, corresponding brazing tapes can also be used, which can be configured as strip-shaped components and can have a binding agent instead of a sintered connection of the powder particles of hard material and braze material in order to keep the powder particles in tape form. This type of brazing tape can be arranged on the TiAl vane for example also via an adhesive in order to be brazed subsequently by means of the effect of temperature.

Furthermore, it is possible to apply the mixture of hard material and braze material in the form of a paste, which in addition to the particles of hard material and braze material includes an organic binder, which keeps the paste together in a flowable state so that the paste can be applied to the TiAl vane by brushing or imprinting. The organic binder of a brazing paste can have a proportion of 5 to 30% by weight, in particular 10 to 20% by weight, in the total weight of the brazing paste, wherein the proportions of braze material and hard material can be present as indicated above in a ratio of 1:1 to 9:1 of hard material to braze material.

The brazing preforms, brazing tapes or the brazing paste can be brazed on the TiAl vane at temperatures in the range of 900° C. to 1100° C., in particular 940° C. to 1060° C., preferably in the range of 960° C. to 1020° C., wherein the hold times of the corresponding temperatures can be selected to be in the range of 30 seconds to ten minutes, preferably in the range of one minute to two minutes.

After fusing the braze material, the brazed mixture can be cooled in a controlled manner with cooling rates in the range of 10 Kelvin per minute to 100 Kelvin per minute, preferably above the brittle-ductile transition. Uncontrolled cooling is also conceivable.

BRIEF DESCRIPTION OF THE DRAWINGS

The enclosed drawings show the following in a purely schematic manner.

DETAILED DESCRIPTION OF THE DRAWINGS

Additional advantages, characteristics and features of the present invention will be made clear in the following detailed description of the exemplary embodiments based on the enclosed drawings. However, the invention is not limited to these exemplary embodiments.

Figure 1:
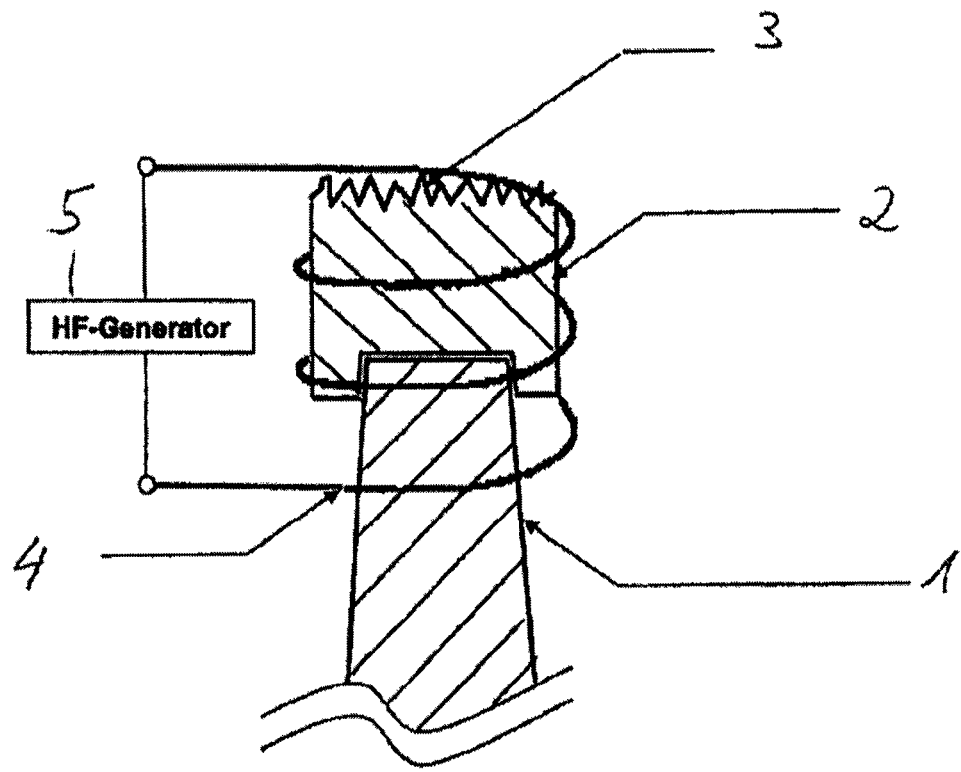
FIG. 1 is a representation of the brazing of an armoring according to the invention by means of pre-sintered brazing preform.

FIG. 1 shows a cross-sectional view through a portion of a TiAl vane, wherein FIG. 1 merely shows the end of a sealing rib or of a sealing fin 1. The end of the sealing rib 1, which fits closely against a stationary body of the turbomachine for sealing purposes and therefore is in sliding contact, is supposed to have improved resistance to wear from a corresponding armoring.

For this purpose, a pre-sintered brazing preform 2, which is formed of a mixture of at least one hard material and one braze material, is attached to the end of the sealing fin 1.

The brazing preform 2 is sintered of a powder mixture of hard-material particles and braze-material particles into a desired form, as shown for example in the cross section depicted in FIG. 1. Projecting hard-material particles 3 are depicted in the region of the sealing surface of the sealing fin 1 as an example.

After the brazing preform 2 is arranged, the brazing preform 2 along with the end region of the sealing fin 1 on which the brazing preform 2 is disposed, is inductively heated. To this end, a coil 4 with a high-frequency generator 5 is arranged to generate high-frequency magnetic alternating fields. Because of a targeted arrangement of the coil 4 in the to-be-heated region of the sealing fin 1 and the brazing preform 2, a targeted introduction of heat limited to the brazing region is possible. Depending upon the braze material, brazing takes place under a vacuum or protective gas.

When using a brazing preform 2 having a 50% proportion of aluminum oxide particles and a 50% proportion of the braze material AMS4777 with 7% by weight chromium, 3% by weight iron, 4.1% by weight silicon, 3% by weight boron and the remainder nickel, the brazing preform 2 and the end of the sealing fin 1 are heated to a temperature in the range of 1000° C. to 1080° C., preferably 1020° C. to 1060° C. and kept at this temperature for one to two minutes. Afterwards, the power of the high-frequency generator 5 is reduced so that a regulated cooling with a cooling rate in the range of 50 Kelvin per minute is achieved. If necessary, an additional cooling, for example via a ventilator or the like can also be used. The use of a ventilator is in principle possible only if brazing is taking place in an Ar atmosphere.

The braze portion of the brazing preform 2 melts because of the heat treatment and forms a solid adhesive bond with the hard-material particles 3 and the TiAl base material of the TiAl vane or the sealing fin 1 resulting in the hard-material particles being securely contained in a matrix of the braze material.

Figure 2:
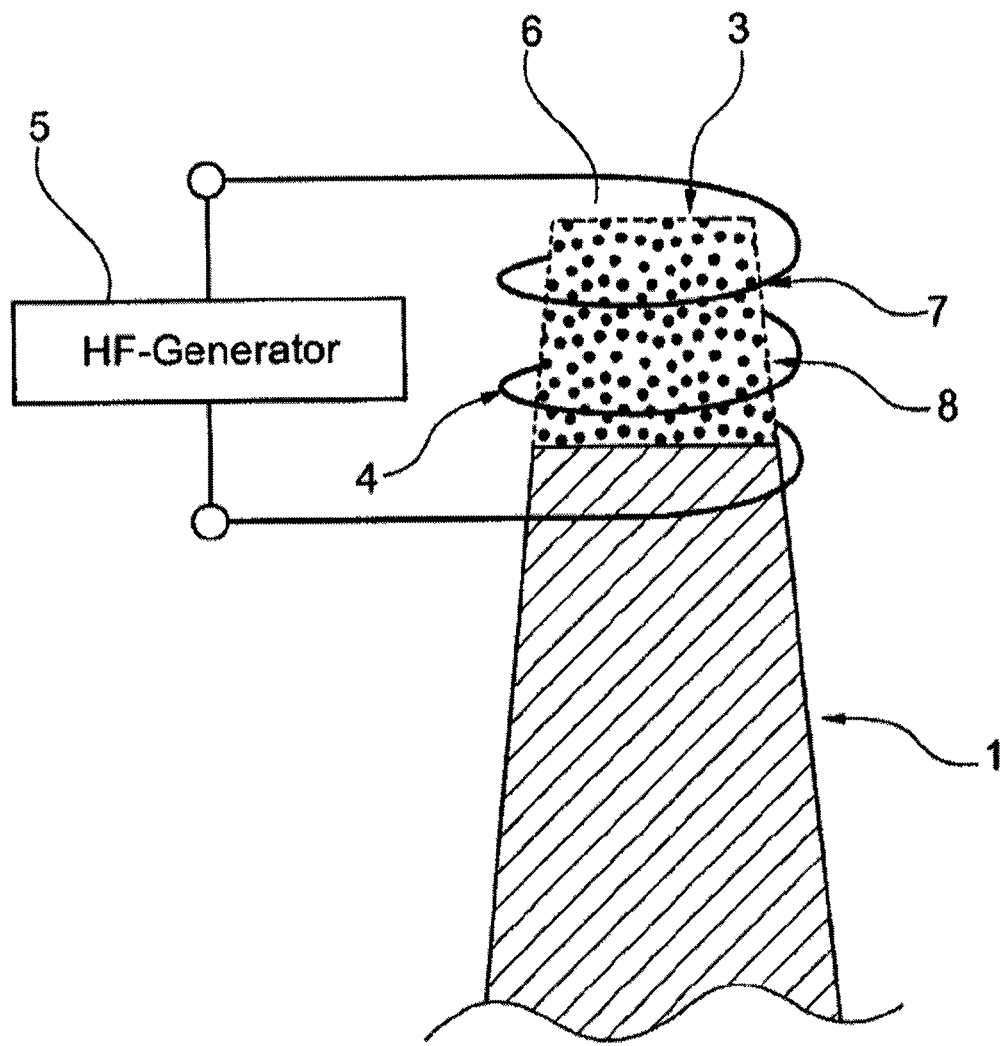
FIG. 2 is a representation of the brazing of a brazing paste for producing an armoring according to the invention on a sealing fin of a TiAl vane.

FIG. 2 shows an alternative embodiment, in which a sealing fin of a TiAl vane is again armored by means of an inductive heating process with the use of a coil 4 and a high-frequency generator 5. However, the armoring is not applied by a brazing preform 2 as in the exemplary embodiment in FIG. 1, but a brazing paste 6 is applied to the sealing fin 1, which paste in turn includes the hard-material particles and particles of a braze material 7. These powder particles of the hard material 3 and braze material 7, however, are included in the brazing paste in an organic binder 8, which makes it possible to apply the brazing paste 6 to the sealing fin 1 by brushing for example.

After applying the brazing paste 6, the brazing region with the brazing paste 6 and the end of the sealing fin 1 to which the brazing paste is applied are correspondingly inductively heated so that first the binder 8 disintegrates and/or vaporizes and then the fused braze material 7 surrounds the hard-material particles 3 and connects adhesively to the sealing fin 1.

The brazing temperatures and hold times can be selected similarly to the exemplary embodiment in FIG. 1, wherein, however, a longer heating period can be planned for the binder to disintegrate and/or vaporize.

Although the present invention was described in detail based on exemplary embodiments, it is clear to a person skilled in the art that this invention is not limited to these exemplary embodiments, but that in fact modifications are possible by omitting individual features or by a different combination of features. The present invention discloses all combinations of the features presented.

The invention claimed is:

1. A method of armoring a titanium aluminum (TiAl) vane of a turbomachine, comprising the steps of:
  applying a mixture of a hard material and a braze material to the TiAl vane, wherein the TiAl vane comprises intermetallic phases of one or both of γ-TiAl and $\alpha_2$-Ti$_3$Al; and
  brazing the mixture on the TiAl vane by an inductive heating process, wherein the braze material is a nickel (Ni)-based braze material.

2. The method according to claim 1, wherein the mixture is applied to a sealing fin of the TiAl vane.

3. The method according to claim 1, wherein the hard material is aluminum oxide, boron nitride, cubic boron nitride, titanium nitride, silicon carbide, tungsten carbide or titanium carbide.

4. The method according to claim 1, wherein the mixture has a ratio of 1:1 to 9:1 between the hard material and the braze material.

5. The method according to claim 1, wherein the mixture has a form of a brazing tape, a pre-sintered brazing preform, or a brazing paste.

6. The method according to claim 5, wherein the pre-sintered brazing preform or the brazing tape is fixed on the TiAl vane prior to the brazing by an adhesive or by welding.

7. The method according to claim 5, wherein the brazing paste includes an organic binder and is applied to the TiAl vane by brushing or imprinting.

8. The method according to claim 7, wherein the organic binder is a proportion of 5% by weight to 30% by weight of a total weight of the brazing paste.

9. The method according to claim 1, wherein a temperature of the brazing is in a range of 900° C. to 1100° C.

10. The method according to claim 1, wherein a hold time at which the mixture is kept at a brazing temperature is in a range of 30 seconds to 10 minutes.

11. The method according to claim 1, further comprising the step of cooling the brazed mixture with a cooling rate in a range of 10° Kelvin/minute to 100° Kelvin/minute.

12. The method according to claim 1, wherein the Ni-based braze material has a predominant proportion of nickel as its largest constituent.

13. A titanium aluminum (TiAl) vane for a turbomachine, comprising:
    a TiAl main part, wherein the TiAl main part comprises intermetallic phases of one or both of $\gamma$-TiAl and $\alpha_2$-Ti$_3$Al; and
    an armoring on the TiAl main part, wherein the armoring includes a mixture of a hard material and a braze material, wherein the braze material is selected from the group consisting of nickel (Ni)-based braze materials AMS47XX, ASM4775, ASM4776, ASM4777, ASM4778, ASM4779 and ASM4782, and wherein the hard material is selected from the group consisting of aluminum oxide, boron nitride, cubic boron nitride, silicon carbide and titanium carbide.

14. The TiAl vane according to claim 13, wherein the mixture has a ratio of 1:1 to 9:1 between the hard material and the braze material.

15. The TiAl vane according to claim 13, wherein the armoring is on a sealing fin of the TiAl vane.

16. The TiAl vane according to claim 13, wherein the Ni-based braze materials have a predominant proportion of nickel as its largest constituent.

* * * * *